April 16, 1940.  L. SILVA ET AL  2,197,323

HARROW

Filed Feb. 24, 1939  2 Sheets-Sheet 2

INVENTOR:—
LEO SILVA &
CLARENCE SILVA
BY Victor J. Evans & Co.
ATTORNEYS.

Patented Apr. 16, 1940

2,197,323

UNITED STATES PATENT OFFICE 2,197,323

HARROW

Leo Silva and Clarence Silva, Mountain View, Calif.

Application February 24, 1939, Serial No. 258,281

2 Claims. (Cl. 55—34)

This invention relates to improvements in harrows, and has particular reference to a toothed type of harrow.

The principal object of the invention is to provide means whereby the teeth of the harrow may be freed from debris and the teeth then reset.

A further object of the invention is to produce a device of this character that is economical to manufacture, light in weight and easy to operate.

Other objects and advantages will be apparent during the course of the following description.

In the accompanying drawings forming a part of this specification and in which like numerals are employed to designate like parts throughout the same, Fig. 1 is a top plan view of our device;

The ordinary harrow is drawn behind a tractor or other tractive means and consists of cross bars having depending ground engaging elements. These elements are in many instances teeth which dig into the ground breaking up clods, smoothing the surface of the ground and picking up weeds, and in some sections, the teeth become clogged and it is necessary to stop operations and to then clean the teeth which is a slow process.

We have, therefore, devised means whereby the operator may pull a cord from his seat on the tractor, and thereby cause the teeth to be automatically released and reset.

Figure 1:
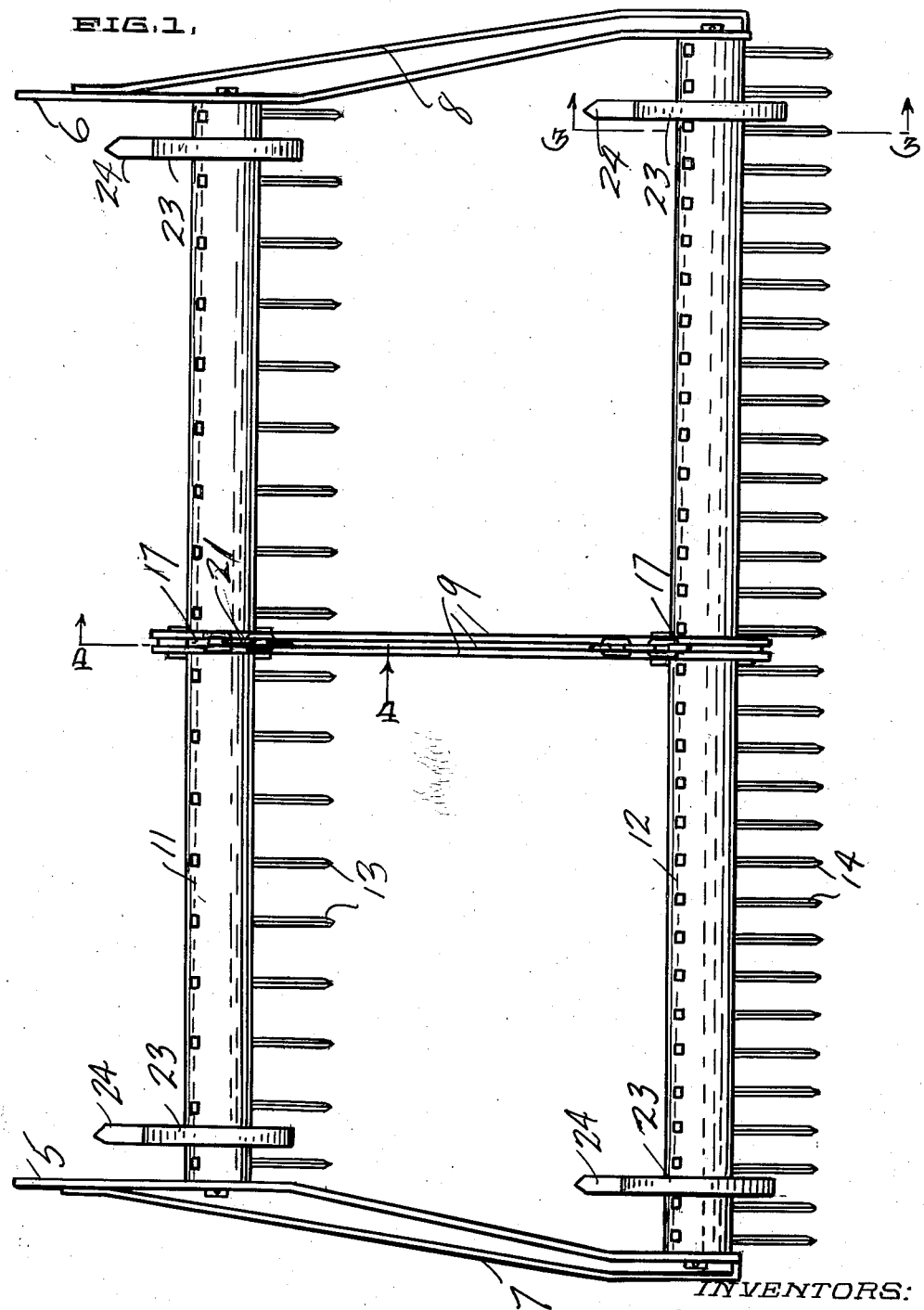
Figure 2:
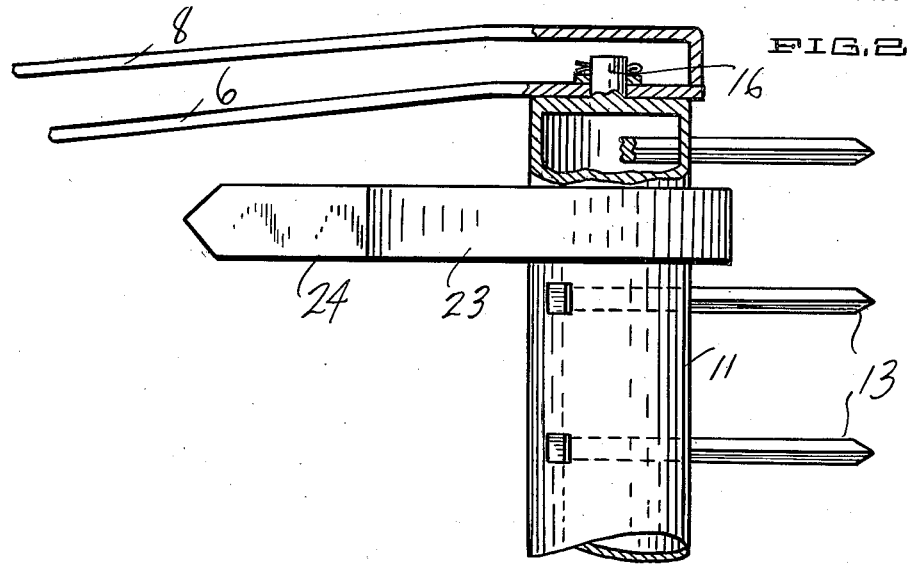
Fig. 2 is an enlarged fragmentary detail view.
Figure 3:
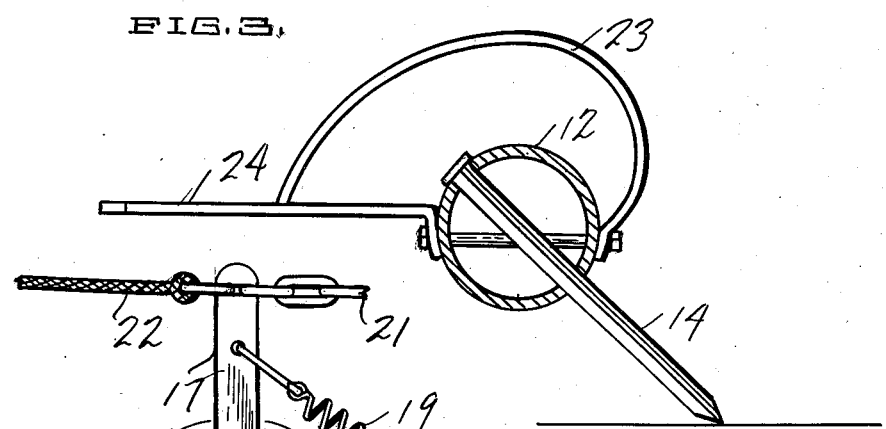
Fig. 3 is a cross sectional view taken on the line 3—3 of Fig. 1.
Figure 4:
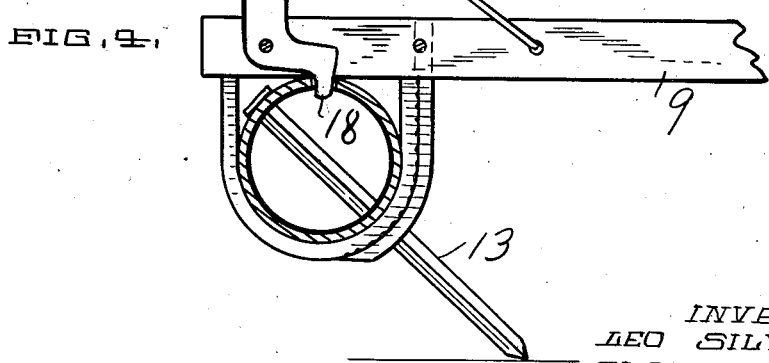
Fig. 4 is a cross sectional view taken on the line 4—4 of Fig. 1.

In the accompanying drawings wherein for the purpose of illustration is shown a preferred embodiment of our invention, the numerals 5 and 6 designate draw bars which are connected to the tractor. Additional braces are shown at 7 and 8 and center braces at 9. Extending between the draw bars 5 and 6 are tubular cross rods 11 and 12, which carry teeth 13 and 14 respectively. These cross rods are rotatably supported by stub axles 16. (See Fig. 2.) In order to prevent rotation of the cross rods when in digging position, we provide a lever 17 having a nose 18 which extends into an opening in the cross rod. It is, of course, understood that there is one of these levers for each cross rod, the same being pivoted between the braces 9. A spring 19 normally holds the lever 17 in the position of Fig. 4, and the two levers are connected together by a chain 21. A cable 22 extends forward to a point adjacent the operator's seat. Mounted adjacent each end of the cross rods are spring members 23 each having a tooth 24 that is bolted to the cross rods. The spring portion 23 forms a skid during the turning operation, as will be described.

Assuming that the device is being drawn over the ground, the teeth 13 and 14 performing their usual function and that an accumulation has piled up in front of the teeth, the operator may now pull the cord 22, which will release the noses 18 of the two levers 17 permitting rotation of the cross rods, thus automatically dumping the debris. The skids 23 have now gone into contact with the ground and will roll over until the teeth 24 engage the ground and cause further rotation until the noses 18 have again engaged their openings, thus locking the teeth again in operative position.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:

1. In a device of the character described, comprising draw bars, tubular cross members rotatably supported at their ends in said draw bars, teeth secured in said tubular cross members, semi-circular skids carried by said tubular cross members and having outwardly extending teeth and extending from the side opposite the teeth, and spring held latch members adapted to enter openings in said tubular cross members, and means for simultaneously operating said latch members.

2. In a device of the character described, comprising draw bars, tubular cross members rotatably supported at their ends in said draw bars, teeth secured in said tubular cross members, skids carried by said tubular cross members and having outwardly extending teeth, two braces intermediate the draw bars and in which the tubular cross members are rotatably mounted, a spring held latch member pivoted between said braces above each tubular cross member and having a tongue normally entering openings in said tubular cross members, a chain connecting said latch members, and a flexible operating cable connected to one of said latch members.

LEO SILVA.
CLARENCE SILVA.